March 9, 1965
CARL-GEORG ROSENKRANZ ETAL
3,172,619
WEFT BOBBIN
Filed June 21, 1962
6 Sheets-Sheet 1
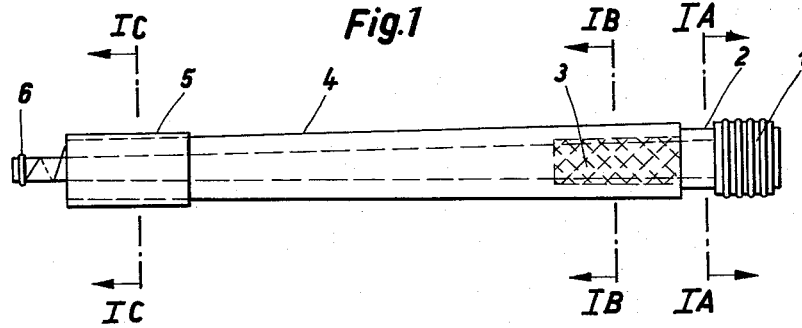
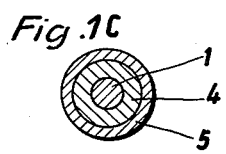 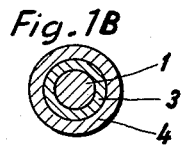 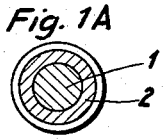
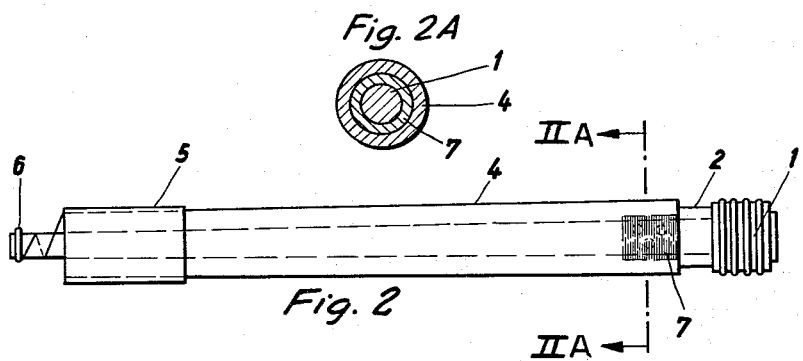
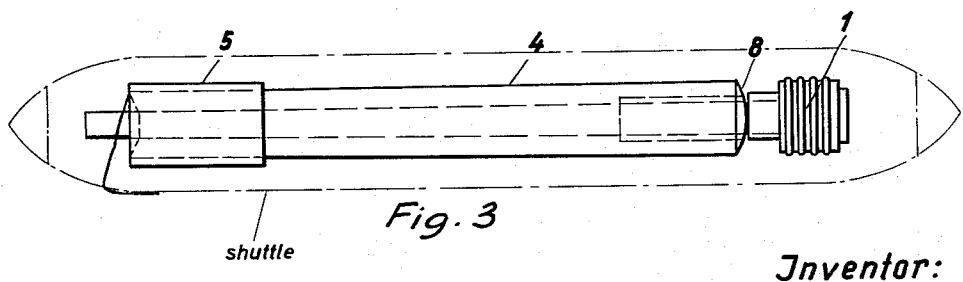
Inventor:
Carl-Georg Rosenkranz
Friedrich Müller
by Mestern, Ross and Mestern Inventor:
Carl-Georg Rosenkranz
Friedrich Müller
by
Mestern, Ross and Mestern March 9, 1965

CARL-GEORG ROSENKRANZ ETAL 3,172,619

WEFT BOBBIN

Filed June 21, 1962

Inventor:
Carl-Georg Rosenkranz
Friedrich Müller by Mestern, Ross and Mestern

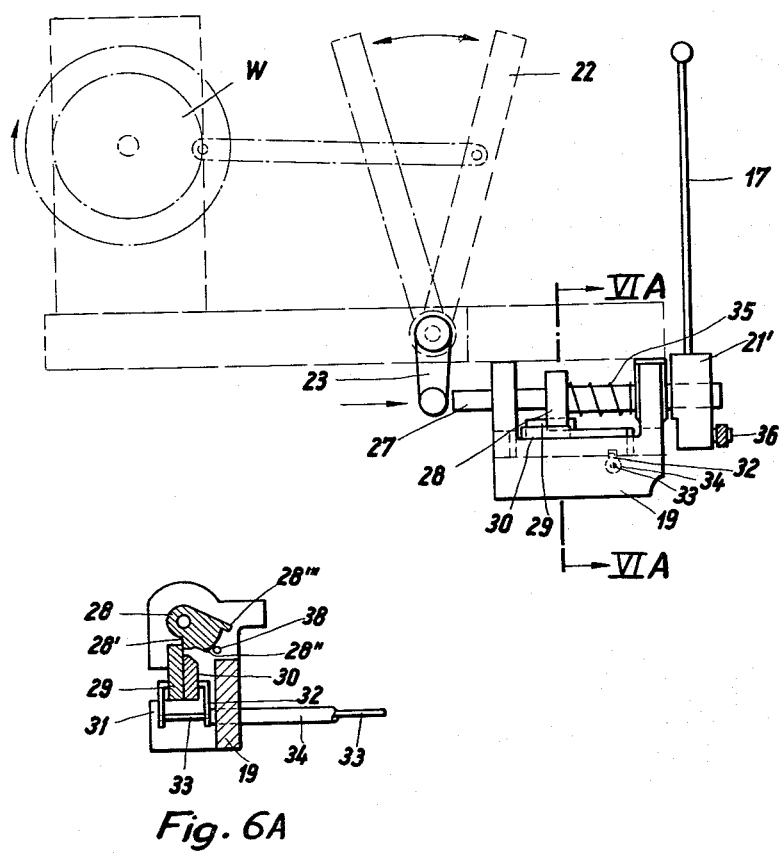

United States Patent Office 3,172,619
Patented Mar. 9, 1965

3,172,619
WEFT BOBBIN
Carl-Georg Rosenkranz and Friedrich Müller, Wuppertal-Barmen, Germany, assignors to Halstenbach and Co., Wuppertal-Barmen, Germany, a German firm
Filed June 21, 1962, Ser. No. 204,194
Claims priority, application Germany, June 26, 1961, H 42,954
5 Claims. (Cl. 242—165)

The present invention relates to weft bobbins for full-width looms having a weft-yarn winding on a bobbin tube with a yarn-reserve winding at the bottom of the bobbin, and to devices for producing such weft bobbins.

Looms used for full-width weaving operate with one or more shuttles which act as carriers for the weft material to be inserted in the warp shed. The weft material is wound on interchangeable weft-bobbin tubes in the form of a so-called cop or pirn winding, the yarn being conutinuously laid from the bottom to the top of the tube in conical cross-wound layers. This kind of winding ensures satisfactory off-running of the yarn because of the conical tip of the weft bobbins. However, this only applies in the case of full bobbins and then only if the yarn cross-windings on the conical tip are not laid loosely or parallel to one another. The run off of the yarn deteriorates as the length of the cop becomes shorter. The friction of the yarn on the shank increases as the tube is progressively exposed. The resultant additional yarn tension finally attains a considerable value.

In addition, in the production of such weft bobbins on the automatic bobbin machines provided therefor, increasing difficulties are met, particularly since ever increasing requirements are being made by weavers with regard to the bobbin velocity and the production of bobbins with invariable run-off capability, particularly when the bobbins are to be used in modern, fast-running automatic looms. It is known that the tension of the yarn increases progressively with the velocity. With the usual pirn windings, this yarn tension is particularly increased by the different tensions which occur in bobbins between the base and the tip of the cone.

There has therefore been no lack of attempts to provide weft bobbins with tubes of special design and having other kinds of winding in order to overcome the afore-mentioned difficulties. However, a satisfactory result has not previously been achieved, especially since weft bobbins are required by weaving mills which would guarantee improved and trouble-free weft working as far as possible using standard tubes with the existing shuttles.

It is accordingly an object of the present invention to provided a weft bobbin for full-width looms which does not have the afore-mentioned disadvantages but which takes into account, in the best possible manner, the present-day requirements regarding faster bobbin operation, greater yarn off-running strength, more even yarn tension and improved utilisation of space and also makes use of standard bobbin tubes preferably having slightly conical shanks. This is achieved in accordance with the invention in that the weft yarn main winding on the weft bobbin consists of cylindrical cross-wound layers extending over the whole length of the tube shank and that between the cross-wound layers and the reserve yarn winding, usually present in such weft bobbins, there is provided a thickened sensing-winding zone which is wound upon the end of the tube shank facing the yarn reserve. A weft bobbin of this kind largely meets the afore-mentioned requirements. By reason of the cylindrical cross-wound layers forming the main winding, exceptionally high yarn run-off strength is guaranteed as is a substantially constant yarn tension during yarn run-off. Moreover, the space provided by the dimensions of the shuttle for accommodating the weft yarn on the bobbin tube can be fully utilised, i.e. the volume of yarn can be correspondingly increased. Compared with known pirn bobbins, the length of yarn wound on the tube can be increased by 30 to 60% in dependance on the yarn material, which results in a correspondingly longer period of use of the new cross-wound weft bobbin. The thickened sensing-winding zone located at the rearward end of the bobbin tube beneath the cross-wound main winding ensures that the bobbin winding can be sensed for the purpose of initiating the changeover of a spool with the least possible waste of yarn. With mechanically or electrically actuated weft sensors, this thickened sensing zone is preferably cross-wound, whereas for optical or light-reflection sensing means the emptying bobbin sleeve preferably comprises parallel windings.

On the cross-wound main winding at the end facing the tip of the bobbin, there may be provided a diameter-compensating winding which forms an exactly cylindrical weft bobbin when using bobbin tubes with a conical shank. This is particularly essential for looms having the so-called "box-loader" device because with these devices the bobbin body must be cylindrical. Also, in this manner the weft bobbins can be better stacked and in particular can also be correctly positioned in the receiving magazine of the loom. It is thus essential that the new weft bobbins have the same diameter at the top of the winding as at the bottom.

Furthermore, a yarn-reserve winding can be provided at the tip of the cross-wound weft bobbin, which is again required for looms having a box-loader device. Finally, it is also advantageous if the cross-wound main winding has a convex base because in this manner the danger of yarn sloughing at this point is further reduced.

For the production of the new cross-wound weft bobbins use is made of a winding device which is provided in known manner with a device for rotatably holding the bobbin tube at both ends, a rotating yarn-guide roller arranged parallel to the tube axis and having cross-thread grooves for displacing the yarn, and means for driving the bobbin. However, in accordance with the invention, the yarn-guide roller is arranged to drive the bobbin and extends over the whole length of the bobbin-tube shank and is held constantly against the bobbin tube or the cross-wound cop forming thereon. At least one yarn control member is provided in front of the yarn-guide roller and is movable substantially longitudinally thereof. The yarn-guide roller is preferably positioned to be rotatably driven at the free end of a forked frame swingable about an axis parallel to the bobbin tube. It has a mid-portion extending over substantially the whole length of the tube shank and provided with intersecting yarn-guide grooves for the main winding, the thickened sensing zone and the diameter-compensating winding, and separate end portions of smaller diameter on which are provided further yarn-guide grooves for the yarn-reserve windings to be wound onto the bottom and also the top of the tube.

Further features and advantages of the new weft bobbins and the device for the production thereof will be described in conjunction with the embodiments partly schematically illustrated in the accompanying drawings, in which:

FIG. 1 is an elevational view of the weft bobbin according to the invention with the thickened cross-wound sensing area for mechanical and electrical sensing;

FIGS. 1A, 1B and 1C are cross-sectional views taken along lines IA—IA, IB—IB and IC—IC, respectively;

FIG. 2 shows a bobbin similar to that shown in FIG. 1 but with a thicker parallel-wound sensing area for optical sensing;

FIG. 2A is a cross-sectional view taken along line IIA—IIA of FIG. 2;

FIG. 3 shows a further embodiment of a completely wound weft bobbin with a rounded convex base at the rearward end of the winding;

FIGS. 6 and 7 show operating arrangements for the yarn control members;

FIGS. 6A and 7A are cross-sectional views taken along lines VIA—VIA and VIIA—VIIA of FIGS. 6 and 7, respectively.

Figure 4:
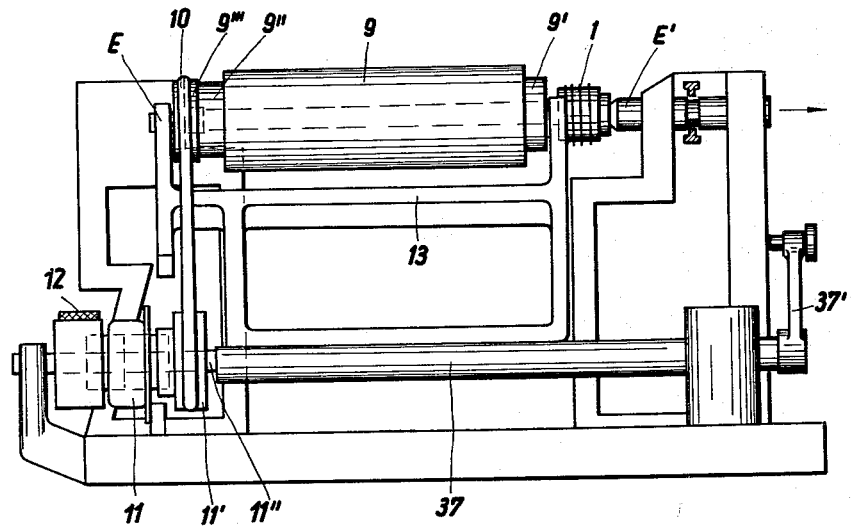
FIGS. 4 and 4a are side- and end-elevational views respectively, of the winding position of the new winding device.

FIG. 1 shows the formation of a completely wound bobbin. The usual yarn-reserve winding 2 (FIG. 1A) is provided on a standard tube or spindle 1 with a conical shank for automatic machines. The yarn reserve is required in order to be able to carry out replacement of the tube when empty by a full bobbin. Whereas in conventional pirn bobbins this yarn reserve takes into account the requirements of such bobbins, this would not be the case with the cross-wound bobbin according to the present invention. The pirn bobbin is made up of short conical winding layers which are continuously displaced towards the top. Because of the short traverse, the yarn windings are fairly close to one another. The feeler of the sensing member thus only makes contact when the bobbin has run out practically to its final layer. This is not the case with the new cross-wound bobbin, in which each winding layer is laid over the whole length of the winding. At the beginning of the bobbin, even after applying quite a number of yarn layers, there are still rhombic sections of the shank of the tube which are empty, i.e. sections on which the sensing member acts. The result would be that the changeover step would be initiated too early and this would cause wastage of the yarn material. Therefore, in accordance with the invention, a thickened sensing zone 3 is wound on behind the yarn reserve 2 and only then is laying of the main winding 4 over the whole length of the winding effected. During weaving, the main winding 4 is drawn off first and finally the thickened sensing zone 3. Closing of the sensing member circuit is then effected by its two feelers contacting the empty sections of the shank of the tube or a contact plate provided for this purpose, and thus no appreciable wastage of the yarn can occur. A thickened sensing zone 3 is provided in cross-wound form in FIG. 1 and is illustrated in cross-section (FIG. 1B).

The main winding is wound over the thickened sensing zone 3 in cylindrical cross-wound layers which extend from the bottom to the top of the bobbin. The diameter of the winding decreases toward the tip in accordance with the particular tube shape in use. Bobbins which are to be used in automatic looms which are provided with a box-loader device must be cylindrical and should therefore not have a diameter which is smaller at the top than at the bottom. In order to take this requirement into account, a diameter compensating winding 5 is provided at the end of the main winding at the top of the shank. Consequently, the bobbins can be satisfactorily stacked in the storage boxes. Also, the bobbins easily roll into the changeover position in the supply magazines.

Finally, a yarn reserve 6 is wound on at the top of the shank as this also is essential in automatic looms having a box-loader device.

In the cross-wound bobbin illustrated in FIG. 2 and in FIG. 2A, the thickened sensing zone 7 is not cross-wound but consists of a parallel winding, i.e. the yarn coils are adjacent one another. A sensing winding of this kind is particularly advantageous for optical and light-reflection sensing means.

As shown in FIG. 3, the cross-wound bobbin according to the invention can be provided with a winding having a convex base 8.

Devices suitable for preparing cross-wound bobbins in accordance with the invention are illustrated in FIGS. 4–8.

Figure 4A:
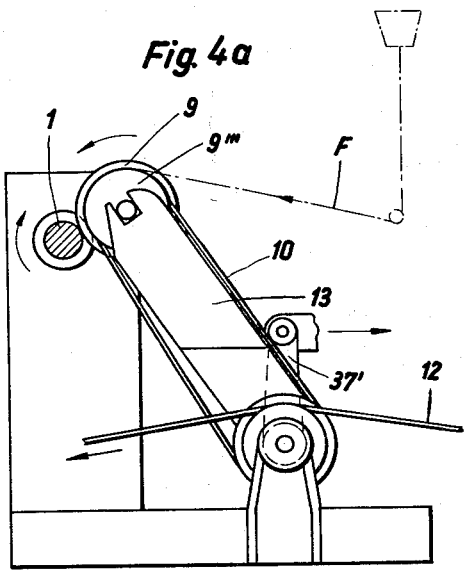

Referring now to FIGS. 4 and 4a, the bobbin tube 1 is rotatably positioned with both ends in a holding device E, E' which release it in synchronism with bobbin changeover. The bobbin tube 1 is caused to rotate by a yarn guide roller 9 with a reversed yarn groove, i.e. by the yarn supplying member. The roller 9 is driven by a tangential belt 12 via an electromagnetic coupling 11, a driving wheel 11', a belt 10 and a coupling wheel 9''' located at one end of the roller 9. The roller 9 is positioned in a forked frame 13 which is secured on a pivotable shaft 37 and can thus undergo a corresponding swinging movement about the axis of such shaft. The driving coupling 11 and the wheel 11' are arranged coaxially with the shaft 37 on a carrying axle 11'' which supports the latter. On the shaft 37 there is provided a control arm 37' which is preferably adjustable and by means of which a known changeover device can be controlled in dependence on the desired bobbin diameter. The bobbin yarn is indicated by F in FIG. 4a.

Figure 5:
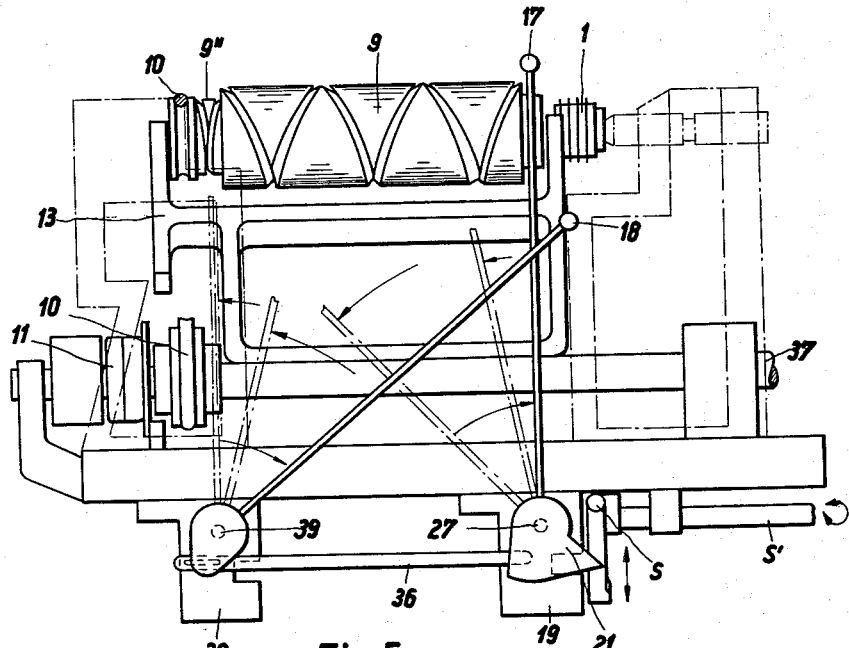
FIGS. 5 and 5a are side and plan views, respectively, of the winding device and indicate the path of the yarn and various operating positions of the yarn control members associated with the yarn guide roller.
Figure 5A:
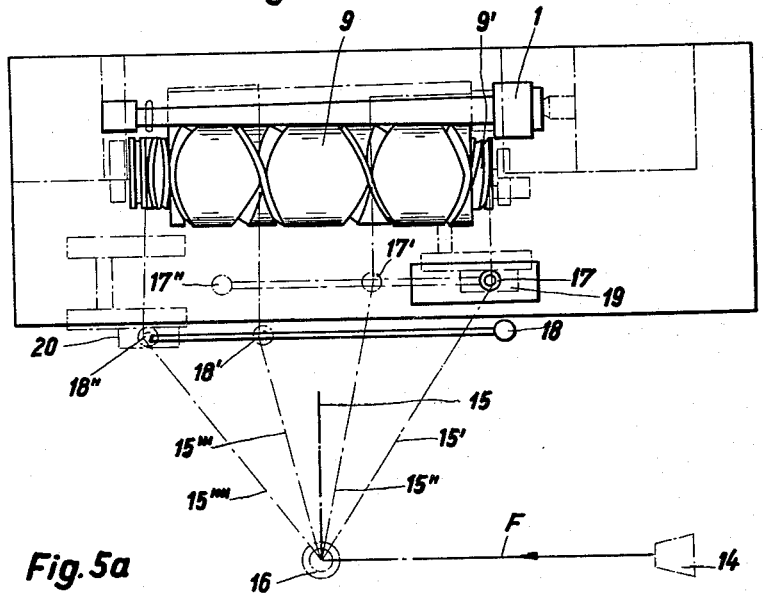

As can be seen from FIGS. 5 and 5a, yarn control members in the form of two movably arranged yarn guide rods 17, 18 are provided in front of the roller 9. These serve for preparing the reserve winding 2, the thickened sensing zone 3 or 7, the main winding 4, the diameter compensating winding 5 and the reserve 6 at the top of the bobbin, according to their position in relation to the roller 9. Movement of the yarn-guide rods is controlled by a mechanism 19 for the rod 17 and a mechanism 20 for the rod 18. As shown in FIG. 6, the control mechanism 19 is driven by the lever 23 of the automatically operated changeover device W. Before winding begins, the yarn-guide rods 17 and 18 are in the positions illustrated in FIG. 5.

FIG. 6 and the cross-section (FIG. 6A) show the construction of the mechanism 19. A cam 28 located on an axially displaceable rotating shaft 27 associated with the rod 17 is pressed with its abutment edge 28' against an adjustable abutment 29 by a torsion spring 35. This cam position corresponds to the path 15' of the yarn shown in FIG. 5a. From a supply bobbin 14, the yarn passes through a yarn guide eyelet 16 to the rod 17 and via a reserve groove 9' on the bobbin tube 1.

After the reserve 2 has been wound on, the lever 23 is rotated further in the direction indicated by the arrow by movement of a rocker arm 22 driven by the changeover device W. The shaft 27 is thus moved to the right. As soon as the cam 28 is out of engagement with the abutment 29, it rotates under the action of the torsion spring 35 until a shoulder 28'' thereof comes to rest against an abutment 30. The yarn guide rod 17 is thus brought into the position 17' (FIG. 5a), whereby the yarn passes from the crossing groove 9' and into the main groove of the roller 9. Since, however, the yarn guide rod 17 is in the position indicated at 17', the yarn is always returned to the first cross-winding position. Thus, a thick winding of cross-wound layers is formed on the sensing zone 3 of the bobbin.

When the cam 28 is moved out of engagement with the abutment 30 upon the further displacement of the shaft 27 by the control lever 23, the yarn-guide rod 17 is again moved until a shoulder 28'' of the cam 28 abuts a retaining pin 38. The yarn guide rod 17 is thus moved further to the left into the position 17''. The yarn 15 can now run freely in the grooves of the roller 9. The winding of the main winding 4 thus begins.

The abutments 29, 30 operating in conjunction with the abutment shoulders of the cam 28 are adjustable by fingers 31 and 32. The finger 31 is mounted on a shaft 33, while the finger 32 is arranged on a hollow shaft 34.

The abutments 29 and 30 can be moved into the desired position by means of these shafts. In this way it is possible to alter the winding period of the reserve 2 or of the thickened sensing zone 3 and to control the yardage of yarn to be wound on to the bobbin. If the sensing zone 3 comprises a parallel winding as shown in FIG. 2 instead of the cross-wound winding mentioned above, the abutment is constructed such that the cam 28 can rotate continuously, corresponding to its displacement by the shaft 27.

Figure 7:
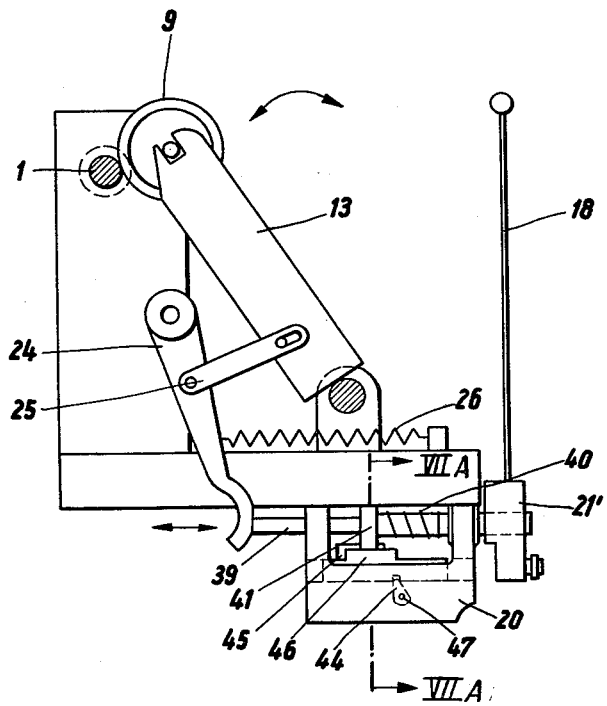
Figure 7A:
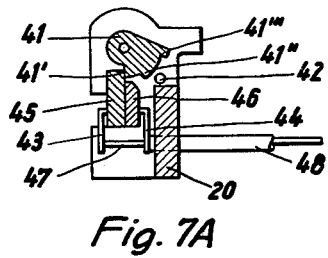

The winding period for the main winding 4 is controlled by the guide rod 18 and by the control mechanism 20 thereof which is illustrated in FIGS. 7 and 7a. The construction corresponds essentially with the previously described control mechanism 19. Displacement of a shaft 39 is caused by a rocking lever 24 which is moved by a link 25 by means of a swinging arm 13. The latter moves as the bobbin diameter increases. The yarn-guide rod 18 remains at rest in the position illustrated in FIG. 5 until the rocking lever 24 has moved the shaft 39 so far as a result of the rotation of the swinging arm 13 that a cam 41 or its control shoulder 41″ comes out of engagement with an abutment 45. By rotating the cam 41 until the shoulder 41″ abuts the abutment 46, the rod 18 is brought into the position 18′ (FIG. 5). Consequently, movement of the yarn is limited so that at the second intersection of the groove on the roller 9 the yarn always has to return to the left-hand end of the roller 9. The compensating winding 5 is thus formed in this position. Upon continued oscillation of the frame 13, the shaft 39 is further displaced until finally the shoulder 41″ of the cam 41 disengages from the abutment 46. The cam then rotates further until a shoulder 41‴ abuts a pin 42. The yarn-guide rod 18 is thus moved to the position 18′ (FIG. 5) where it directs the yarn into the cross-threaded groove 9″. The reserve 6 at the top of the bobbin now forms on the shank. The length of yarn wound on to the bobbin at this position is controlled by disengagement of the magnetic coupling 11. The roller 9 is thus no longer driven and the winding operation is terminated.

From the foregoing it is clear that the diameter of the main winding 4 is determined by the position of the abutment 45 (FIG. 7). By the position of the abutment 46, the smaller diameter at the top of the bobbin is made the same as the diameter at the bottom of the bobbin by winding on the diameter compensating winding 5. In similar manner to the abutments 29, 30 of the control mechanism 19, the abutments 45, 46 are adjusted by means of fingers 43, 44 located on positioning shafts 47, 48.

The two yarn-guide rods 17, 18 are coupled together by means of a slotted guide rod 36 which permits suffcient movement of the rods and which engages the rotating hubs of the rods. By means of a swivel arm S (FIG. 5) controlled from the changeover device W through the shaft S′, the yarn-guide rods 17, 18 can be returned to the starting position shown in FIG. 5 after the winding operation has terminated.

Figure 8:
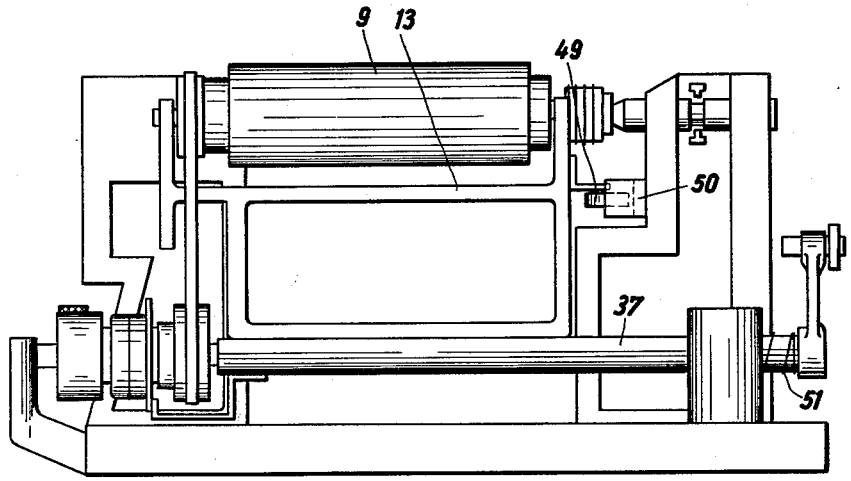
FIGS. 8 and 8a are side and plan views respectively of a device serving for the production of cross-wound weft bobbins with a convex winding base.
Figure 8A:
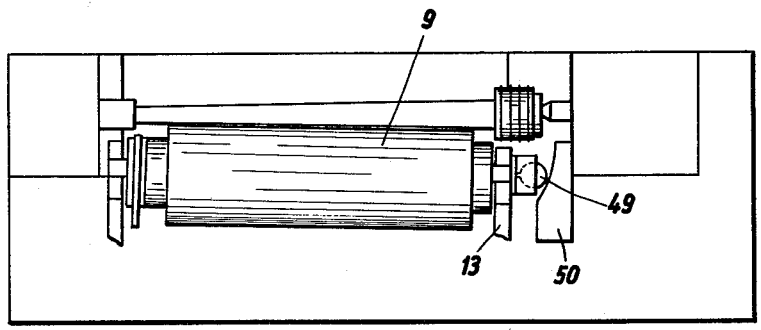

The preparation of bobbins having a rounded base can be carried out with the winding device illustrated in FIG. 8. A roller 49 is secured to the movable frame 13. Because of the increasing diameter of the bobbin, the frame 13 is tilted as hereinbefore described. The roller 49 therefore runs against a control curve 50 which is rigidly secured to the machine frame. The whole assembly, i.e. the roller 9, the mounting 13 with the rotating shaft 37 and the driving members located thereon, is displaced laterally in accordance with the shape of the curve, i.e. in the direction towards the top of the bobbin. A compression spring 51 is thus compressed. After a bobbin changeover, the roller 9 again lies adjacent the shank to be wound under the control of the changeover device, the rotary shaft 37 and the frame 13 secured thereto again being pivoted back. The roller 49 runs against the curve 50, so that the compression spring 51 returns the shaft 37 and the frame 13 to the starting position.

A similarly controlled yarn guide eyelet or a different yarn-control member could be provided in front of the roller 9 instead of the yarn guide rods 17, 18 illustrated. It is merely essential that this control member is so arranged and moved that it guides or holds the yarn securely over the various operative sections of the roller 9 during the winding operation, and positions the yarn so that its path is as indicated in FIG. 5a, at 15, 15′, 15″, 15‴ and 15⁗.

We claim:

1. A weft bobbin for a full-width loom, comprising an elongated bobbin tube having an extremity adapted to cooperate with a sensing element for initiating bobbin change, a main winding of yarn extending over a major portion of the length of said tube; an auxiliary winding at least partly underlying said main winding at said extremity and adapted to run-off upon uncoiling of said main winding, said main winding consisting at least outwardly of said auxiliary winding of generally cylindrical cross-wound layers of said yarn extending substantially the full length of said main winding and having a periphery defined by straightline generatrices extending parallel to said tube from a point proximal to said sensing extremity to the opposite extremity of said tube, tube converging with slight conicity away from said sensing extremity toward said opposite extremity; and a compensating winding adapted to run off prior to said main winding and overlying the latter at said opposite extremity, said compensating winding having an outer diameter substantially equal to the diameter of said main winding at said sensing extremity.

2. A bobbin as defined in claim 1 wherein a further yarn-reserve winding is provided at said opposite extremity.

3. A bobbin as defined in claim 1 wherein said auxiliary winding is composed of generally cylindrical, cross-wound layers of said yarn parallel to said tube at said sensing extremity.

4. A bobbin as defined in claim 1 wherein said auxiliary winding is composed of generally parallel turns of said yarn.

5. A bobbin as defined in claim 1 wherein said main winding has a convex base at said sensing extremity.

References Cited by the Examiner
UNITED STATES PATENTS

| | | | |
|---|---|---|---|
| 1,444,414 | 2/23 | Colman | 242—165 |
| 1,614,420 | 1/27 | Brown et al. | 242—165 |
| 1,718,629 | 6/29 | Boyd | 242—26.41 X |
| 1,886,598 | 11/32 | Schweiter | 242—18 |
| 1,888,395 | 11/32 | Schweiter | 242—18 |
| 2,520,134 | 8/50 | Drake | 242—27.1 |
| 2,695,138 | 11/54 | Perry et al. | 242—18 |
| 2,757,885 | 8/56 | Barraclough et al. | 242—176 |
| 2,921,752 | 1/60 | Bourassa et al. | 242—27.1 |

FOREIGN PATENTS 459,771 9/13 France.

MERVIN STEIN, *Primary Examiner.*

JOSEPH P. STRIZAK, RUSSELL C. MADER, *Examiners.*